United States Patent [19]
Kishi et al.

[11] Patent Number: 5,000,995
[45] Date of Patent: Mar. 19, 1991

[54] MAGNETIC RECORDING MEDIUM AND METHOD

[75] Inventors: Fumio Kishi, Kawasaki; Takayuki Yagi, Tokyo; Kenji Suzuki; Hiroshi Takagi, both of Yokohama, all of Japan

[73] Assignee: Canon Kabushiki Kaisha, Tokyo, Japan

[21] Appl. No.: 287,015

[22] Filed: Dec. 21, 1988

[30] Foreign Application Priority Data

Dec. 23, 1987 [JP] Japan ................................ 62-323760

[51] Int. Cl.$^5$ ............................................. H01F 10/02
[52] U.S. Cl. .................... 428/64; 204/192.2; 427/128; 427/132; 427/296; 428/694; 428/900
[58] Field of Search ................................ 427/127–132, 427/48, 296; 428/64, 694, 900; 204/192.2

[56] References Cited

U.S. PATENT DOCUMENTS

| | | | |
|---|---|---|---|
| 4,443,826 | 4/1984 | Sawada et al. | 360/113 |
| 4,601,912 | 7/1986 | Arai et al. | 427/132 X |
| 4,673,612 | 6/1987 | Takagi et al. | 428/216 |
| 4,756,967 | 7/1988 | Hashimoto et al. | 428/336 |

*Primary Examiner*—Bernard Pianalto
*Attorney, Agent, or Firm*—Fitzpatrick, Cella, Harper & Scinto

[57] ABSTRACT

A method for preparing a magnetic recording medium comprises forming a magnetic recording layer on a substrate by the physical vapor deposition method, wherein the incident angle on initiation of film formation of the flux of particles is 60° or more and the incident angle on finishing of film formation is 0° to 45° and said recording layer is a vertically magnetized film.

7 Claims, 5 Drawing Sheets

FIG. 5 ial vapor deposition method has recently become the
MAGNETIC RECORDING MEDIUM AND METHOD

BACKGROUND OF THE INVENTION

1. Field of the Invention

This invention relates to a method for preparing a magnetic recording medium.

2. Related Background Art

In recent years, higher densification of magnetic recording medium such as tape, disc and so forth has been more strongly demanded, and researches and developments of various mediums are under progress. The method of using a thin metal film for the magnetic recording layer of a magnetic recording medium is on of them.

As the method for forming such a metal thin film recording layer, studies have been made regarding the wet process by plating and physical vapor deposition methods, by way of vacuum vapor deposition, sputtering and so forth. However, since in the wet process, management of a plating bath is cumbersome and unsuitable for continuous film formation, and also severe management is required in waste liquor disposal, thus involving difficult problems, the method by use of physmain stream.

As the method by physical vapor deposition, the method of forming a recording layer by oblique vapor deposition of Co Ni alloy has been widely studied, and otherwise the method of forming a Co type alloy (primarily Co-Cr alloy) as the recording layer has been studied. A Co type alloy is excellent as the recording layer of a vertically magnetized film and can accomplish high density recording.

In formation of the recording layer according to the physical vapor deposition method such as vacuum vapor deposition or sputtering as described above, in most cases, it is necessary to form a film of the magnetic recording later while heating a non-magnetic substrate in order to obtain desired magnetic characteristics. By heating, rigidity of the substrate will be remarkably lowered. For this reason, the substrate can be conveyed with difficulty internally of the vacuum film formation device, whereby defects such as wrinkles will be readily generated on the substrate. Also, at the portion where the magnetic recording layer is formed, energy carried by the incident flux of particles is applied to elevate further the temperature of the substrate, whereby particularly wrinkles are readily generated. This tendency becomes further pronounced as the thickness of the substrate is reduced. The wrinkles formed on the substrate will affect greatly the magnetic characterics such as dropout, etc.

A vertically magnetized film has been generally deemed to be suitable for digital recording, and in that case, for accomplishing high density recording, it has been considered that the magnetic characteristics macroscopically observed are required to have strong vertical anisotropy (this corresponds to small diversion of readily magnetizable axes of individual microcrystals of a magnetic material from the medium normal line direction, when microscopically observed). For this reason, in order to orient the C-axis of the h.c.p. structure of the Co type alloy well in the normal line direction of the substrate, the incident direction of the flux of particles is restricted so that the incident flux of particles may be incident vertically onto the substrate during film formation, particularly at the initial stage of growth of the alloy film. However, when the flux of particles is restricted in this manner, film formation begins from the greatest density of flux of particles, which may be also a cause for promoting generation of wrinkles as described above.

Also, another problem arises when such vertically magnetized film is used for analog recording of broad band, such as VTR. More specifically, in a magnetic recording medium with strong vertical anisotropy, the reproduction outputs of some low frequency components are reduced, causing inconveniences in recording which requires signals of broad band. For example, in VTR, tracking signals or color difference signals and so forth employ a band of 1 MHz or lower and, when the output is lowered in this frequency band, defective tracking or "turbidity" of color will occur.

On the other hand, when the magnetic recording medium of the metal thin film is directly slid against a head, the partner will be excessively abraded and therefore it cannot be provided for practical application as such. For this reason, by providing a protective layer such as Co type oxide or $SiO_2$ on the recording layer and further providing a lubricating layer comprising a fluorine type resin, etc. thereon, improvement of durability has been effected. However, depending on the use, durability is still insufficient, and in addition to a protective layer and a lubricating layer, it has been also required to investigate the mechanical strength of the magnetic recording layer itself.

SUMMARY OF THE INVENTION

The present invention is intended to improve these problems of the prior art and provide a method for preparing a magnetic recording medium which can form a magnetic recording medium without generation of wrinkles and also having excellent durability even when a thin substrate may be used.

According to the present invention, there is provided a method for preparing a magnetic recording medium which comprises forming a magnetic recording layer on a substrate by the physical vapor deposition method, wherein the incident angle on Initiation of film formation of the flux of particles is 60° or more and the incident angle on finishing of film formation is 0° to 45° and said recording layer ia a vertically magnetized film.

Thus, by making the slanted angle of the incident flux of particles of vapor deposited metal on initiation of film formation a specific angle or more, deformation with the heat of the substrate will not be concentrated on one site but diverged, whereby generation of wrinkles can be prevented. Also, by making the slanting of the incident angle of the incident flux of particles on finishing of film formation a specific angle or less, deterioration of the mechanical strength of the vapor deposited layer can be prevented. Further according to the preparation method of the present invention, a magnetic recording medium more suited for recording of signals with spectrum being distributed over a broad frequency band region from low frequency to high frequency can be obtained.

DETAILED DESCRIPTION OF THE PREFERRED EMBODIMENT

Figure 1:
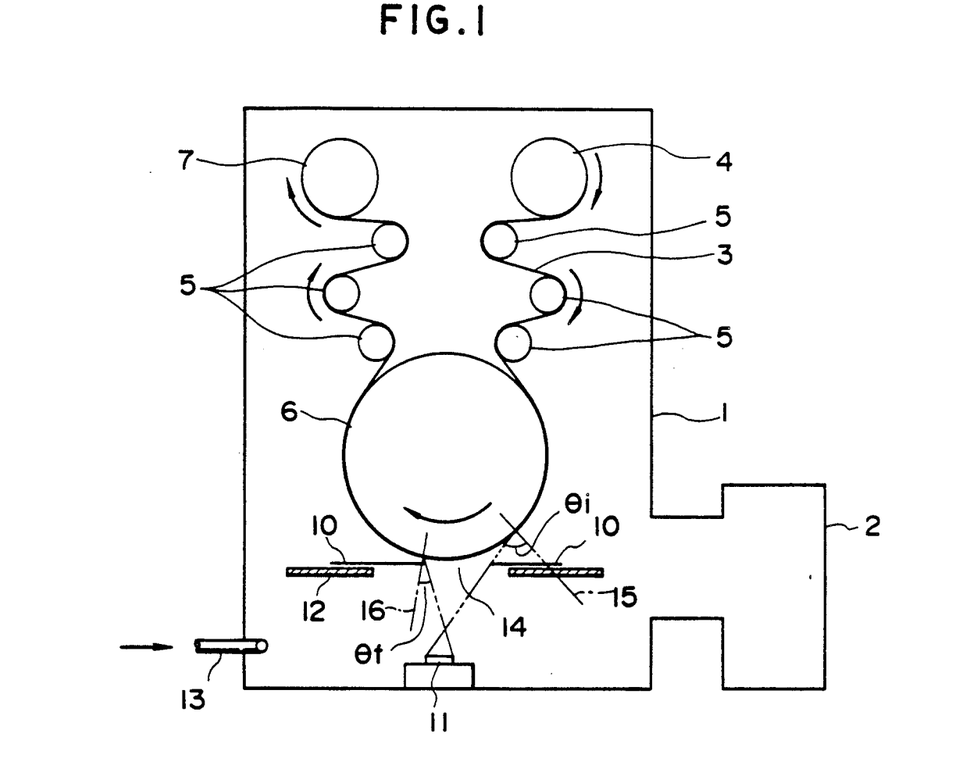
FIG. 1 is a schematic sectional view showing an example of the device to be used for preparation of the magnetic recording medium of the present invention.

In the case of preparing a metal thin film type magnetic recording medium by the physical vapor deposition method such as the vacuum vapor deposition method or sputtering, as shown in FIG. 1, a non-magnetic substrate 3 is led from a delivery roll 4 via an intermediate free roller 5 to a heating can 6, where it receives a flux of particles from an alloy target (or a vaporization source) 11 incident passing through an opening 14 of a shielding plate 10 provided on the attachment preventive plate, thereby forming a metal film which becomes a magnetic recording layer on the substrate. The substrate 3 having the metal film formed thereon reaches a wind-up roll 7 via the intermediate free roller 5 to be wound up thereon. Thus, a metal thin film type magnetic recording medium is prepared. 13 is a pipe for introducing argon gas into a vacuum tank 1. The heating can 6 sets the circumferential surface temperature at up to 300° C. as desired.

The vacuum vapor deposition device and the sputtering device are distinguished by whether the flux of particles is vaporized from a vaporization source or sputtered from a sputtering target, and therefore they have substantially the same constitution of device.

As the material to be used for the magnetic recording layer, a Co type alloy which becomes a vertically magnetized film is preferred. The Co type alloy takes a h.c.p. structure, with the C-axis direction becoming the readily magnetizable direction. Concretely, other than Co-Cr alloy, Co-V, Co-Mo, Co-W, Co-Cr-Pd, Co-Cr Mo, Co-Cr-Rh alloys and alloys containing slight amount of additives added thereto can be used. In these alloys, Co-Cr alloys are suitable in particular.

The coercive force $Hc\perp$ in the direction vertical to the substrate surface of the magnetic recording layer of the Co type alloy becomes higher as the temperature of the substrate 3 becomes higher. The temperature of the substrate 3 is equal to the circumferential temperature of the heating can 6. The coercive force $Hc\perp$ is required to be practically at least 400 öe. For this purpose, the substrate temperature should be made preferably 80° C. or higher in vacuum vapor deposition, and 50° C. or higher in sputtering.

As the substrate 3, a film of polyethyleneterephthalate, polyimide or aramide is suitable.

The thickness of the magnetic recording layer may be suitably within the range of 5 to 100 μm, and the thickness of the substrate within the range of 0.05 to 1.0 μm.

On the magnetic recording, as the protective layer, a layer comprising a film obtained by oxidation of the magnetic recording layer surface, $Al_2O_3$, $SiO_2$, $Co_3O_4$, Co-Cr-O or Co-Ni-O may be also provided. Further as the lubricating layer an organic film such as fluorine type resin or ester type oligomer may be also provided on the protective layer.

Figure 2:
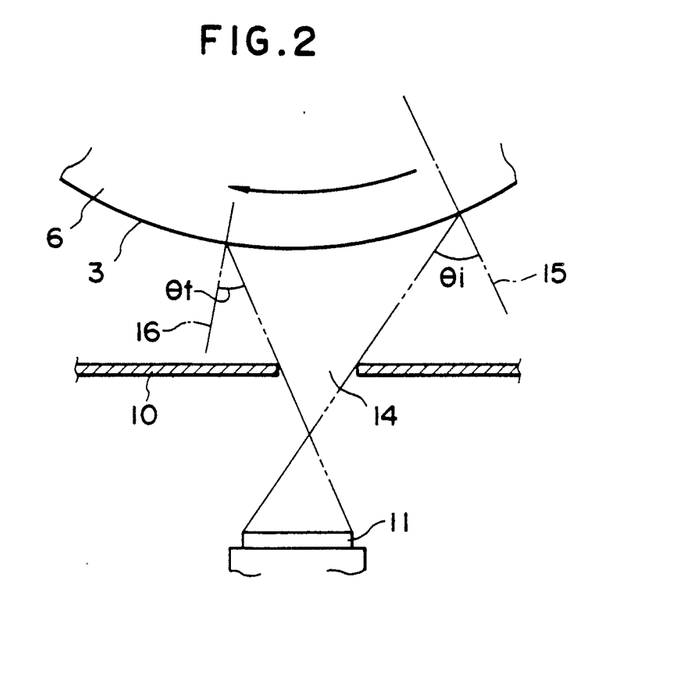
FIG. 2 is a sectional view showing the state of flux of particles near the film forming portion shown in FIG. 1.

Now, the incident angle $\theta i$ on initiation of film formation has been known to be a parameter which determines the direction of crystal growth at the initial stage on the occasion of the formation of the magnetic recording layer, and at the same time an important factor which dominates the magnetic characteristics of the recording layer as a whole (for example, see Sugita et al., Collected Gists of Scientific Lectures, the 7th Meeting of Applied Magnetic Society of Japan, P. 7, etc.). The incident angle $\theta i$ on initiation of film formation represents the slanted angle measured to the conveying direction of the substrate 3 from the normal line 15 to the incidence initiation direction of the incident flux of particles (the line connecting the front end of the substrate conveying direction of the alloy target 11 to the rear end relative to the same direction of the opening 14 of the shielding plate 10).

On the other hand, the incident angle $\theta f$ on finishing of film formation represents the slanted angle measured rearward to the conveying direction of the substrate 3 from the normal line 16 to the incidence finishing direction of the flux of particles (the line connecting the rear end of the substrate conveying direction of the alloy target 11 to the front end of the opening 14). $\theta i$ and $\theta f$ are adjusted by setting suitably the position of the shielding plate 10.

Figure 3A:
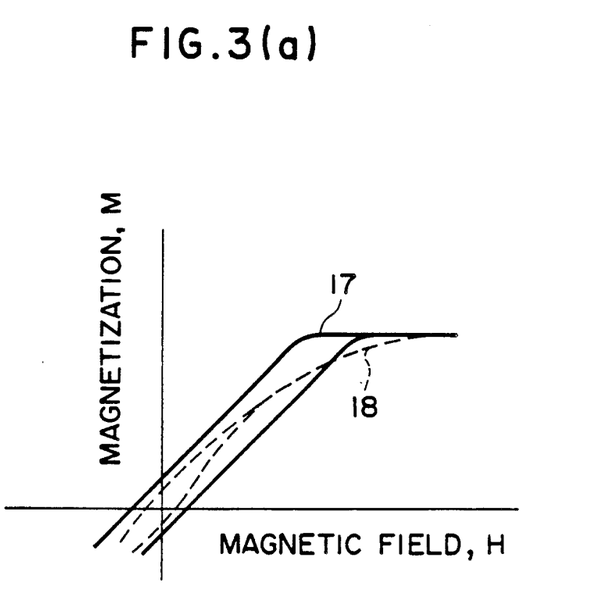
FIGS. 3(a) and 3(b) are graphs of magnetization curves of magnetic recording medium.
Figure 3B:
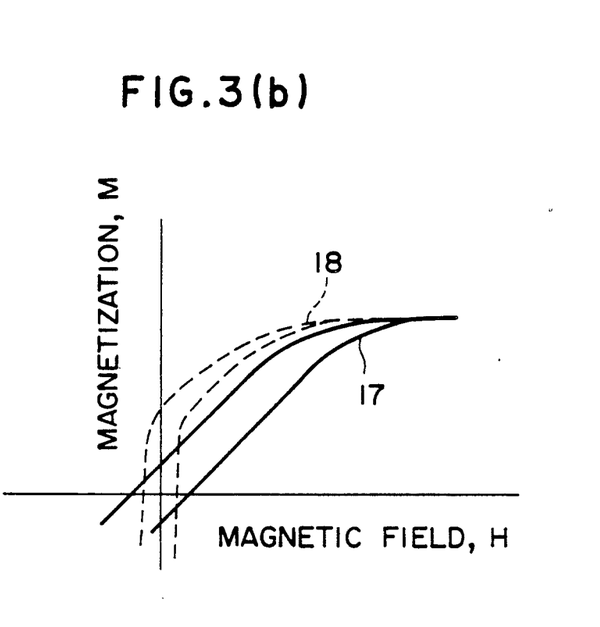

In FIGS. 3(a) and 3(b), the solid line 17 shows a magnetization curve When a magnetic field is applied in the direction vertical to the film surface of a magnetic recording layer, and the broken line 18 shows a magnetization curve when a magnetic field is applied in the interplanar direction of the magnetic recording layer.

When $\theta i$ is small, as shown in FIG. 3(a), the residual magnetization in the interplanar direction is small, whereby a magnetization with an angular ratio in the vertical direction approximate to 1 (good vertical orientation) is obtained.

When $\theta i$ is large, as shown in the same FIG. (b), magnetization in the interplanar direction becomes large, Whereby the angular ratio in the vertical direction is lowered. The characteristics as shown in FIG. 3(b) have been deemed to damage the characteristics of high density recording.

However, when there is a band of signals over a broad band of frequency, the reproducing output in the low frequency band becomes lower with the characteristics as shown in FIG. 3(a), whereby inconveniences are encountered in practical application. For this reason, it is necessary to determine $\theta i$ at an adequate value so as to obtain output with good balance throughout the whole band.

Accordingly, as described in detail in Examples, by varying $\theta i$, some samples were prepared and frequency characteristics were examined by use of a commercially available VTR deck by use of a ring head and a still video player. As the result, as shown by the frequency characteristics in FIGS. 4 to 6, in such device, it has been found that at a high frequency region, there is no great change in reproducing output even if $\theta i$ may be different, and in the medium to low frequency region, the reproducing output becomes higher when $\theta i$ is greater, namely the interplanar direction component of magnetization is greater.

It has been also confirmed at the same time that enlargement of $\theta i$ has the effect of inhibiting generation of wrinkles during film formation. The reason may be estimated as described below.

The process of generation of wrinkles may be considered as follows. During film formation of a magnetic recording layer, the substrate 3 is heated by incidence of particles, whereby dimensional change through thermal expansion occurs. When $\theta i$ is small, the number of particles incident per unit area of the substrate is increased to result in abrupt heating of the substrate, whereby dimensional change cannot be well dispersed or relaxed to generate wrinkles. Once wrinkles are generated, that portion is raised from the heating can 6 to shut down the flow-out path of heat and the temperature is further elevated to cause thermal deformation of the substrate, which remains as a large wrinkle.

In contrast, when $\theta i$ is made large, the density of incident particles becomes gradually larger as the substrate is conveyed, and therefore elevation of temperature also proceeds gradually. Also, since deposition of a metal film onto the substrate proceeds in the meantime, rigidity of the film as a whole is elevated also gradually, and therefore dimensional change by heat of the substrate will not be concentrated on one site but readily diverged, whereby generation of wrinkle can be prevented. Accordingly, $\theta i$ is preferably 60° or more, more preferably 65° or more, especially 70° or more.

On the other hand, as for $\theta f$, which does not significantly affect magnetic characteristics, it is desirably made larger in order to increase the yield of physical vapor deposition. However, as the result of investigations, it has been found that abrasion resistance will be badly affected if $\theta f$ exceeds a certain limit. The cause may be estimated to be as described below.

When $\theta f$ is large, and when the sliding surface of the head is observed after the magnetic recording medium and a head are slid, powdery foreign matter may be sometimes attached thereon. This may be considered to be a part of the abraded surface of the magnetic recording layer, which may be considered to be due to deterioration of abrasion resistance because the protective layer is also lost at the same time. Such abrasion of the surface may be considered to be due to inferior mechanical strength of the upper layer portion, because the magnetic recording layer is formed with incident particles obliquely from behind and therefore the density of incident particle becomes smaller, if $\theta f$ is large.

For the above reasons, $\theta f$ is desirably 0° 45°, more desirably 0° to 40°.

Further, in the present invention, the source material 11 in FIG. 1, which is an alloy target or a vaporization source, is located on the place wherein the normal at the center of the vaporization surface of the source material is caused to intersect with the axis of the rotation of the can 6. Further, the source may be located so that the normal may not intersect with the axis, provided that the distance between the normal and the axis is one tenth of the radius of can 6 or less, and preferably one twentieth of it or less. When the vaporization surface is not planar, the supposed flat surface of the vaporization surface, which is projected onto a plane, is looked upon as the vaporization surface.

The present invention is described below by referring to Examples.

EXAMPLE 1

By use of a polyimide resin film with a thickness of 10 $\mu$m as the non-magnetic substrate, by means of a high frequency sputtering device shown in FIG. 1, a magnetic recording layer of $Co_{82}Cr_{18}$ alloy with a thickness of about 0.4 $\mu$m was formed, and further a protective layer comprising Co oxide with a thickness of about 100 Å was formed by the reactive sputtering method to prepare a magnetic recording medium.

The film forming conditions for the magnetic recording layer were a pressure of $5 \times 10^{-4}$ Pa or less, a thrown power density of 10 W/cm$^2$, argon gas pressure of 0.3 Pa, a heating can temperature of 150° C., $\theta i = 75°$ and $\theta f = 30°$.

Formation of the protective layer was carried out according to the reactive sputtering method by means of substantially the same device as that shown in FIG. 1 by use of a Co target by introducing oxygen simultaneously with argon. The film forming conditions were a reached pressure of $5 \times 10^{-4}$ Pa, thrown power density of 2.5 W/cm$^2$, oxygen introduced amount of 2.0 cc/min., (Ar+$O_2$) gas pressure of 0.3 Pa and heating can temperature of room temperature.

EXAMPLE 2

A magnetic recording medium was prepared according to the same constitution and the steps as in Example 1 except for $\theta i = 65°$.

EXAMPLE 3

A magnetic recording medium was prepared according to the same constitution and the steps as in Example 1 except for $\theta f = 40°$.

EXAMPLE 4

A magnetic recording medium was prepared except that the magnetic recording layer was formed by the electron beam vapor deposition method. The film forming conditions for the recording layer were reached pressure of $5 \times 10^{-4}$ Pa or less, film forming rate of 2000 Å/sec., heating can temperature of 230° C., $\theta i = 75°$ and $\theta f = 30°$.

EXAMPLE 5

A magnetic recording medium was prepared according to the same constitution and the steps as in Example 4 except for $\theta i = 65°$.

EXAMPLE 6

A magnetic recording medium was prepared according to the same constitution and the steps as in Example 4 except for $\theta f = 40°$.

EXAMPLE 7

A magnetic recording medium was prepared in the same manner as in Example 1 except that an aramid film with a thickness of 30 $\mu$m was used as the non-magnetic substrate and the heating can temperature during formation of the magnetic recording layer was made 120° C.

EXAMPLE 8

A magnetic recording medium was prepared in the same manner as in Example 2 except that an aramid film with a thickness of 30 $\mu$m was used as the non-magnetic substrate and the heating can temperature during formation of the magnetic recording layer was made 120° C.

EXAMPLE 9

A magnetic recording medium was prepared in the same manner as in Example 3 except that an aramid film with a thickness of 30 $\mu$m was used as the non-magnetic substrate and the heating can temperature during formation of the magnetic recording layer was made 120° C.

COMPARATIVE EXAMPLE 1

A magnetic recording medium was prepared according to the same constitution and the steps as in Example 1 except for $\theta i = 50°$.

COMPARATIVE EXAMPLE 2

A magnetic recording medium was prepared according to the same constitution and the steps as in Example 4 except for $\theta f = 50°$.

COMPARATIVE EXAMPLE 3

Figure 4:
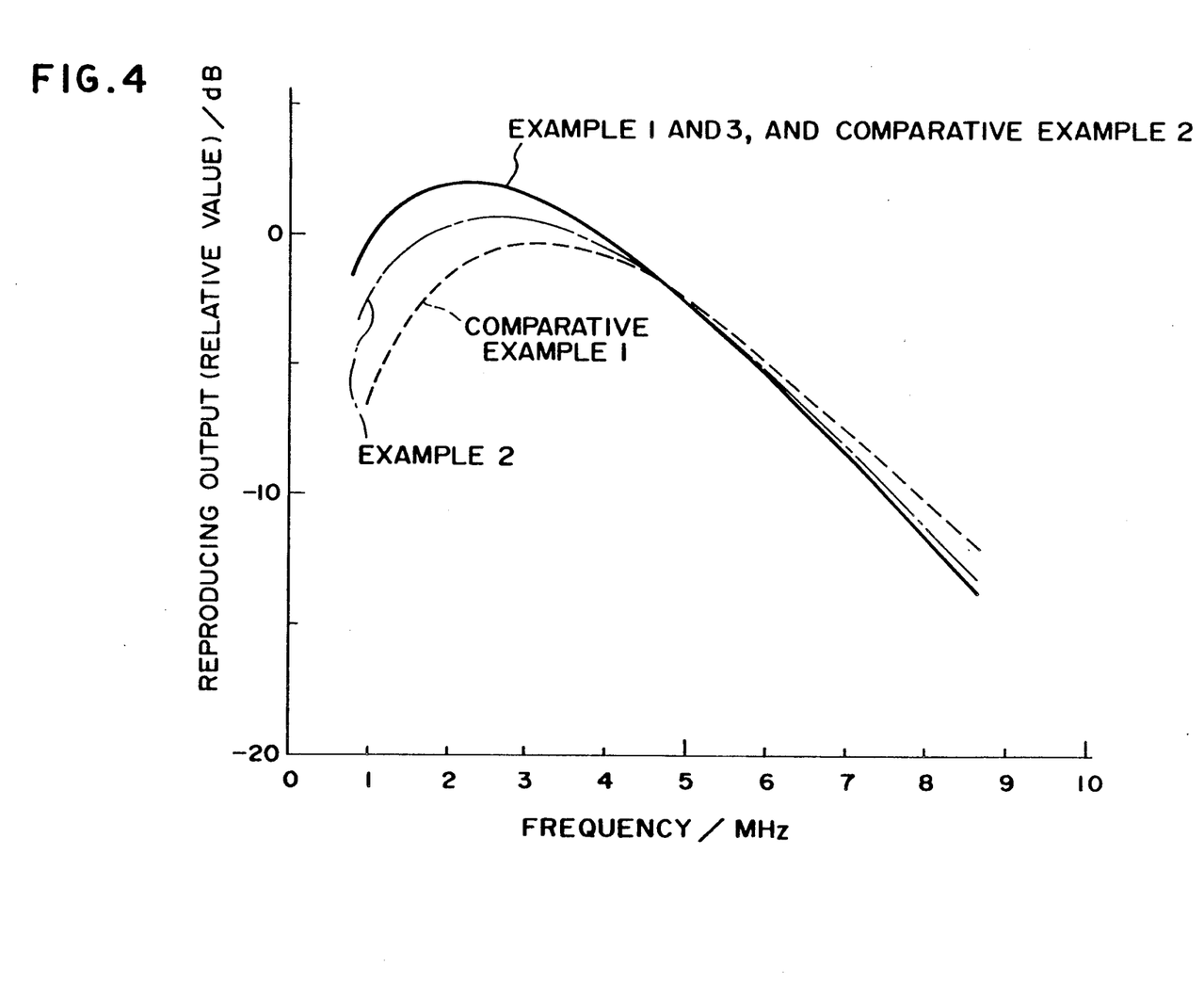
FIGS. 4, 5 and 6 are graphs of frequency characteristics of reproducing output.
Figure 5:
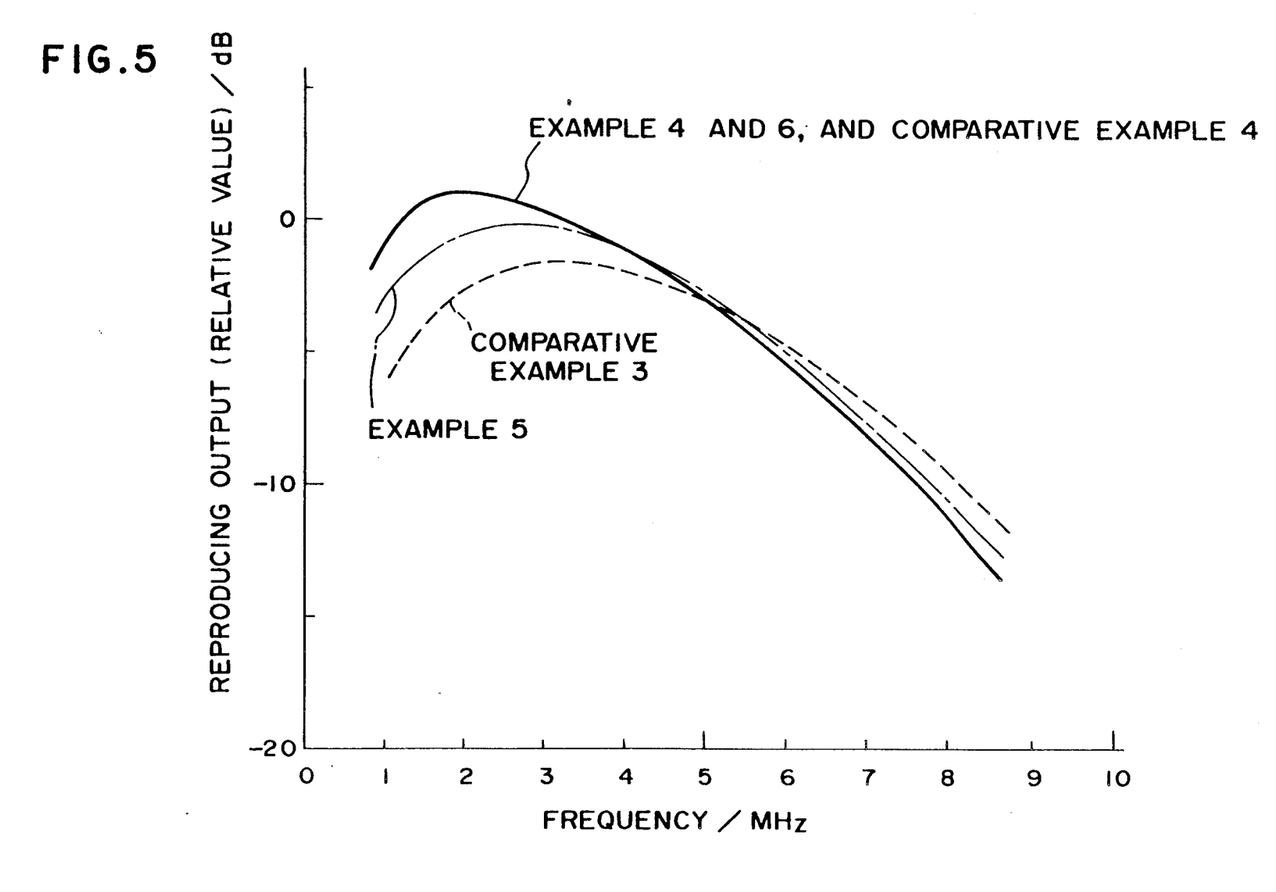

A magnetic recording medium was prepared according to the same constitution and the steps as in Example 4 except for $\theta i = 55°$. and measurement of frequency characteristics and durability test were conducted by means of a commercially available 8 mm VTR deck. The measurement results of frequency characteristics are shown in FIG. 4 and FIG. 5.

The durability test was conducted according to the method in which after recording of a test pattern, reproduction was performed repeatedly, and the changes in head output and drop-out number with the pass number were examined. The standards for judgement of durability are as follows. Lowering in output on 200th pass of repeated reproduction within 3dB was rated as A, 3dB or more as B and one with drop-out number exceeding 200/min. before reaching 200 passes as C. The number of drop-out was counted in such manner that it is one when lowering in output by 16dB or more than average output continued for 15 μsec or longer. The results of durability test are shown in Table 1.

For the magnetic recording media of Examples 7 to 9 and Comparative examples 5, 6, each medium was punched into a disc of 47 mm in diameter, which was mounted with a center core and a cartridge to prepare a video floppy disc. For these, by use of a commercially available still video player, measurement of frequency characteristics and durability test were conducted.

TABLE 1

| Sample | θi | θf | Number of Wrinkle | Durability | Remarks |
|---|---|---|---|---|---|
| Example 1 | 75° | 30° | 0 | A | High frequency sputtering |
| Example 2 | 65° | 30° | 0 | A | High frequency sputtering |
| Example 3 | 75° | 40° | 0 | A | High frequency sputtering |
| Example 4 | 75° | 30° | 0 | A | Electron beam vapor deposition |
| Example 5 | 65° | 30° | 0 | A | Electron beam vapor deposition |
| Example 6 | 75° | 40° | 0 | A | Electron beam vapor deposition |
| Comparative Example 1 | 55° | 30° | 4 | A | High frequency sputtering |
| Comparative Example 2 | 75° | 50° | 0 | B | High frequency sputtering |
| Comparative Example 3 | 55° | 30° | 9 | A | Electron beam vapor deposition |
| Comparative Example 4 | 75° | 50° | 0 | C | Electron beam vapor deposition |

TABLE 2

| Sample | θi | θf | Number of Wrinkle | Durability |
|---|---|---|---|---|
| Example 7 | 75° | 30° | 0 | A |
| Example 8 | 65° | 30° | 0 | A |
| Example 9 | 75° | 40° | 0 | A |
| Comparative Example 5 | 55° | 30° | 2 | A |
| Comparative Example 6 | 75° | 50° | 0 | B |

Figure 6:
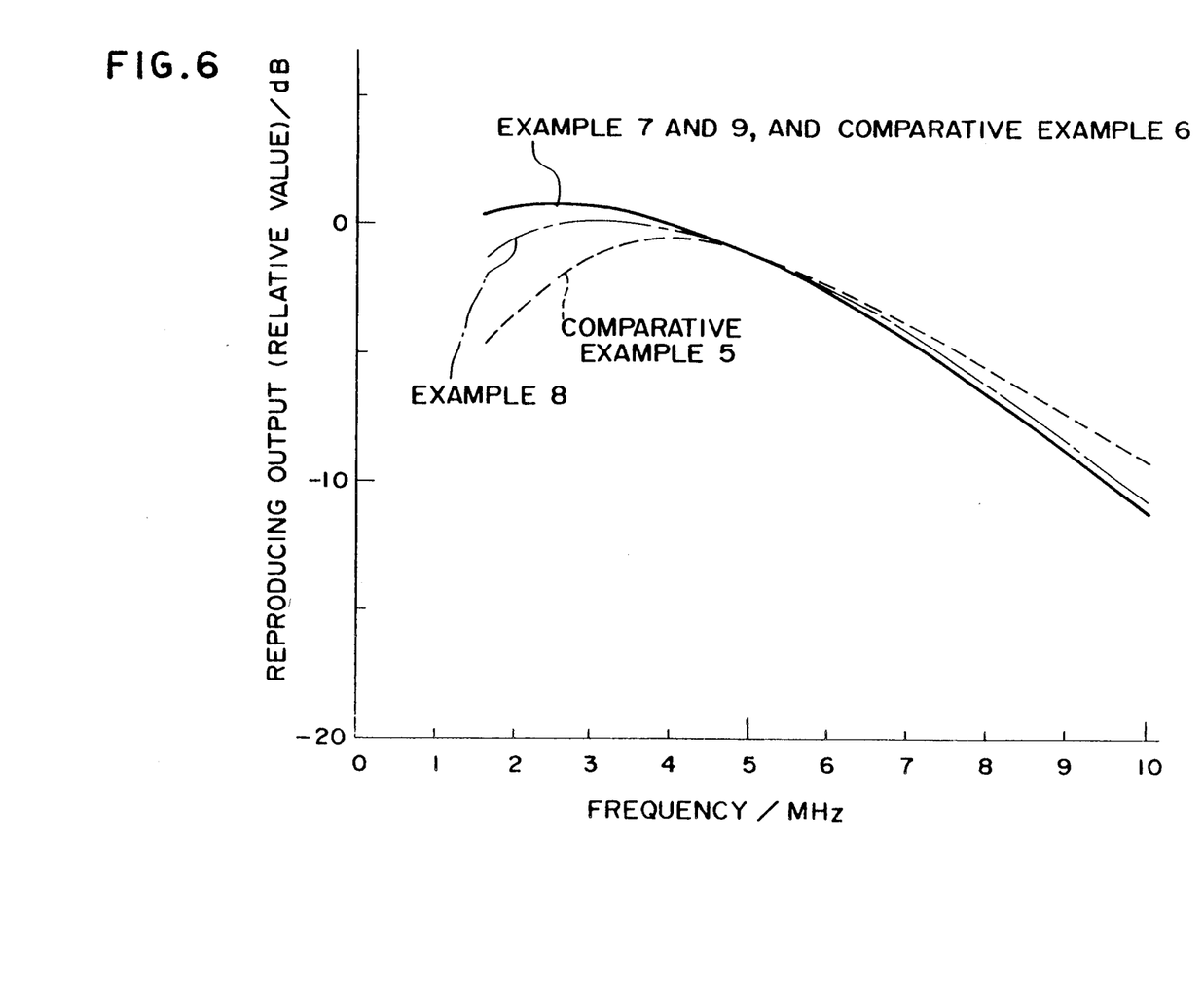

In measurement of frequency characteristics, by use of the 25th track, the optimum value of recording current was determined for each sample and for each frequency, and its current value was used. The measurement results of frequency characteristics are shown in FIG. 6.

For the durability test, after recording of sine wave of 7 MHz, reproduction was repeatedly performed, and lowering in output after running of 3,000,000 passes by within 3 dB as compared with the initial output was rated as A, and 3 dB or higher as B. The results of durability test are shown in Table 2.

COMPARATIVE EXAMPLE 4

A magnetic recording medium was prepared according to the same constitution and the steps as in Example 4 except for $\theta f = 50°$.

COMPARATIVE EXAMPLE 5

A magnetic recording medium was prepared according to the same constitution and the steps as in Example 7 except for $\theta i = 55°$.

COMPARATIVE EXAMPLE 6

A magnetic recording medium was prepared according to the same constitution and the steps as in Example 7 except for $\theta f = 50°$.

For the magnetic recording media prepared in Examples 1 to 9 and Comparative examples 1 to 5, the number of "wrinkle" formed was examined. All of the magnetic recording media had a shape of 10 m in length and a width of 80 mm. The number of wrinkles was counted, with the initial 1 m being excluded, for the range of the remaining 9 m. The results are shown in Table 1 and Table 2.

Next, for the magnetic recording media of Examples 1 to 6 and comparative examples 1 to 4, each medium was cut into a shape of tape with 8 mm of width

What is claimed is:

1. A method for preparing a magnetic recording medium which comprises the steps of conveying a substrate in a conveying direction towards a particle flux source; and forming a magnetic recording layer on said substrate by vapor depositing a flux of particles on said substrate from said particle flux source, wherein the angle of the flux of particles deposited upon the substrate is at least 60° as measured from the conveying direction of the substrate from a line normal to a surface of the substrate at the point on the substrate of film formation initiation to the direction of the incident initiating flux particles, and the angle of the flux of particles deposited upon the substrate is from 0' to 45 ° as measured rearward from a line normal to the substrate surface at the point on the substrate of film formation completion to the direction of the incident finishing flux particles as the substrate is conveyed away from said flux, and said recording layer is a vertically magnetized film.

2. A method according to claim 1, wherein the substrate is either polyethyleneterephthalate, polyimide or aramide.

3. A method according to claim 1, wherein said magnetic recording layer is formed by the vacuum vapor deposition method.

4. A method according to claim 1, wherein said magnetic recording layer is formed by the sputtering method.

5. A method according to claim 1, wherein said magnetic recording layer is a Co-Cr alloy.

6. A tape shaped magnetic recording medium, produced according to the method of claim 1.

7. A floppy disc, produced according to the method of claim 1.

* * * * *

UNITED STATES PATENT AND TRADEMARK OFFICE
CERTIFICATE OF CORRECTION

PATENT NO. : 5,000,995
DATED : March 19, 1991
INVENTOR(S) : FUMIO KISHI ET AL.

Page 1 of 3

It is certified that error appears in the above-identified patent and that said Letters Patent is hereby corrected as shown below:

COLUMN 1

Line 15, "on" should read --one--.
Line 30, "Co Ni alloy" should read --Co-Ni alloy--.

COLUMN 2

Line 44, "Initiation" should read --initation--.
Line 47, "ia" should read --is--.
Line 57, "Further" should read --Further,--.

COLUMN 3

Line 24, "13" should read --Reference numeral 13--.
Line 56, "Within" should read --within--.
Line 60, "Further" should read --Further,--.
Line 61, "layer" should read --layer,--.

COLUMN 4

Line 23, "When" should read --when--.
Line 33, "FIG. (b)," should read --FIG. 3(b),--.
Line 35, "Whereby" should read --whereby--.

COLUMN 5

Line 16, "wrinkle" should read --wrinkles--.
Line 39, "0° 45°," should read --0° to 45°--.

COLUMN 6

Line 25, "prepared except" should read --prepared according to the same constitution and the steps as in Example 1 except--.

UNITED STATES PATENT AND TRADEMARK OFFICE
CERTIFICATE OF CORRECTION

PATENT NO. : 5,000,995
DATED : March 19, 1991
INVENTOR(S) : FUMIO KISHI ET AL.

Page 2 of 3

It is certified that error appears in the above-identified patent and that said Letters Patent is hereby corrected as shown below:

COLUMN 7

Line 10, "$\theta i=55°$. and" should read
--$\theta i=55°$.
    COMPARATIVE EXAMPLE 4
  A magnetic recording medium was prepared according to the same constitution and the steps as in Example 4 except for $\theta f=50°$.
    COMPARATIVE EXAMPLE 5
  A magnetic recording medium was prepared according to the same constitution and the steps as in Example 7 except for $\theta i=55°$.
    COMPARATIVE EXAMPLE 6
  A magnetic recording medium was prepared according to the same constitution and the steps as in Example 7 except for $\theta f=50°$.
  For the magnetic recording media prepared in Examples 1 to 9 and Comparative examples 1 to 5, the number of "wrinkle" formed was examined. All of the magnetic recording media had a shape of 10 m in length and a width of 80 mm. The number of wrinkles was counted, with the initial 1 m being excluded, for the range of the remaining 9 m. The results are shown in Table 1 and Table 2.
  Next, for the magnetic recording media of Examples 1 to 6 and Comparative examples 1 to 4, each medium was cut into a shape of tape with 8 mm of width and--.

COLUMN 8

Lines 23-48, lines 23 to 48 should be deleted.

UNITED STATES PATENT AND TRADEMARK OFFICE
CERTIFICATE OF CORRECTION

PATENT NO. : 5,000,995
DATED : March 19, 1991
INVENTOR(S) : FUMIO KISHI ET AL.

Page 3 of 3

It is certified that error appears in the above-identified patent and that said Letters Patent is hereby corrected as shown below:

COLUMN 10

Line 5, "tape shaped" should read --tape-shaped--.

Signed and Sealed this

Twenty-second Day of December, 1992

Attest:

DOUGLAS B. COMER

*Attesting Officer*   Acting Commissioner of Patents and Trademarks